United States Patent [19]

Ingen Housz

[11] 4,218,146

[45] Aug. 19, 1980

[54] APPARATUS FOR MELTING A THERMOPLASTIC MATERIAL

[76] Inventor: Jan F. Ingen Housz, Drienerbrakenweg 12, Enschede, Netherlands

[21] Appl. No.: 881,504

[22] Filed: Feb. 27, 1978

[30] Foreign Application Priority Data

Feb. 25, 1977 [NL] Netherlands ......................... 7702020

[51] Int. Cl.³ ............................................. B29B 1/06
[52] U.S. Cl. ....................................... 366/78; 366/89; 366/90; 366/149
[58] Field of Search ....................... 366/79, 85, 90, 97, 366/98, 99, 322, 324, 77, 149, 78, 89; 425/207, 208

[56] References Cited

U.S. PATENT DOCUMENTS

| | | | |
|---|---|---|---|
| 3,060,512 | 10/1962 | Martin et al. ................... | 425/208 X |
| 3,456,599 | 7/1969 | Baker ................................. | 366/77 |
| 3,787,542 | 1/1974 | Gallagher et al. ............... | 425/208 X |

FOREIGN PATENT DOCUMENTS 2324581 12/1974 Fed. Rep. of Germany ........... 425/208

*Primary Examiner*—Philip R. Coe
*Attorney, Agent, or Firm*—Becker & Becker, Inc.

[57] ABSTRACT

A method of and apparatus for melting a thermoplastic material in order to obtain an at least nearly homogeneous molten mass, according to which a granular or similar material is melted while it is being transported e.g. by a screw conveyor through a space between a housing of circular cross section and a body rotating in the housing. The transfer of heat to the granular or similar material takes place over at least an axial section of the space between the above mentioned housing and the rotatable body. This space is divided into alternating inlet and discharge channels by first ridges fixedly connected to the rotating body over the above mentioned distance and extending along the inside surface of the housing so as to at least nearly block the passage of molten material, and by second ridges respectively arranged between the first ridges and extending at least substantially parallel to the first ridges while being fixedly connected to the rotating body. The second ridges extend along the inner surface of the housing with a clearing relative to the latter which clearing is such as to substantially prevent the passage of non-molten material through this clearing. There are furthermore provided dams respectively interconnecting the ends of the first and second ridges alternatingly at the supply and at the discharge side so that the melt formed in the inlet channels is separated from the non-molten material by flowing over the second ridges into the discharge channels.

10 Claims, 11 Drawing Figures

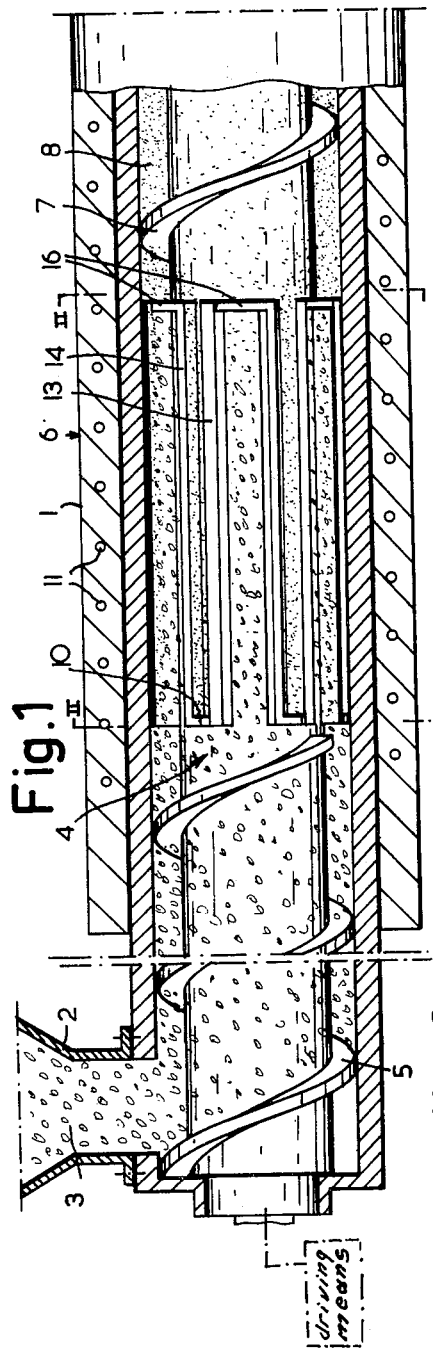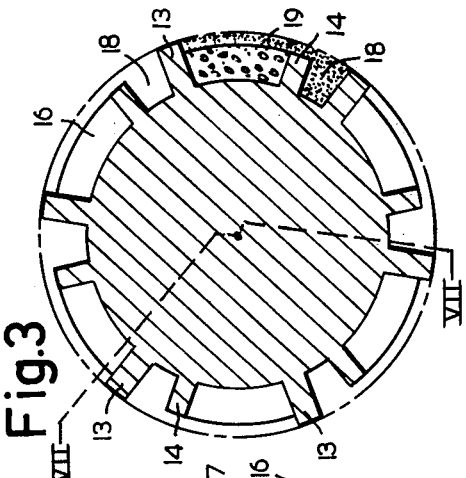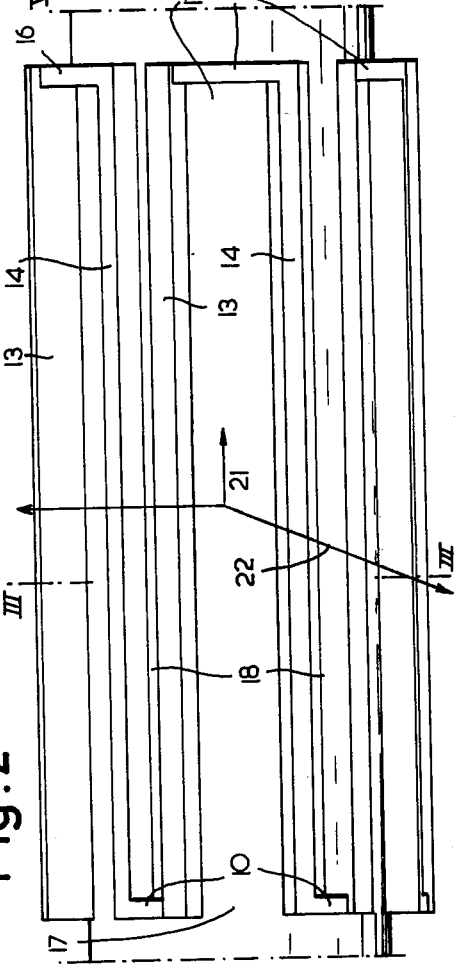

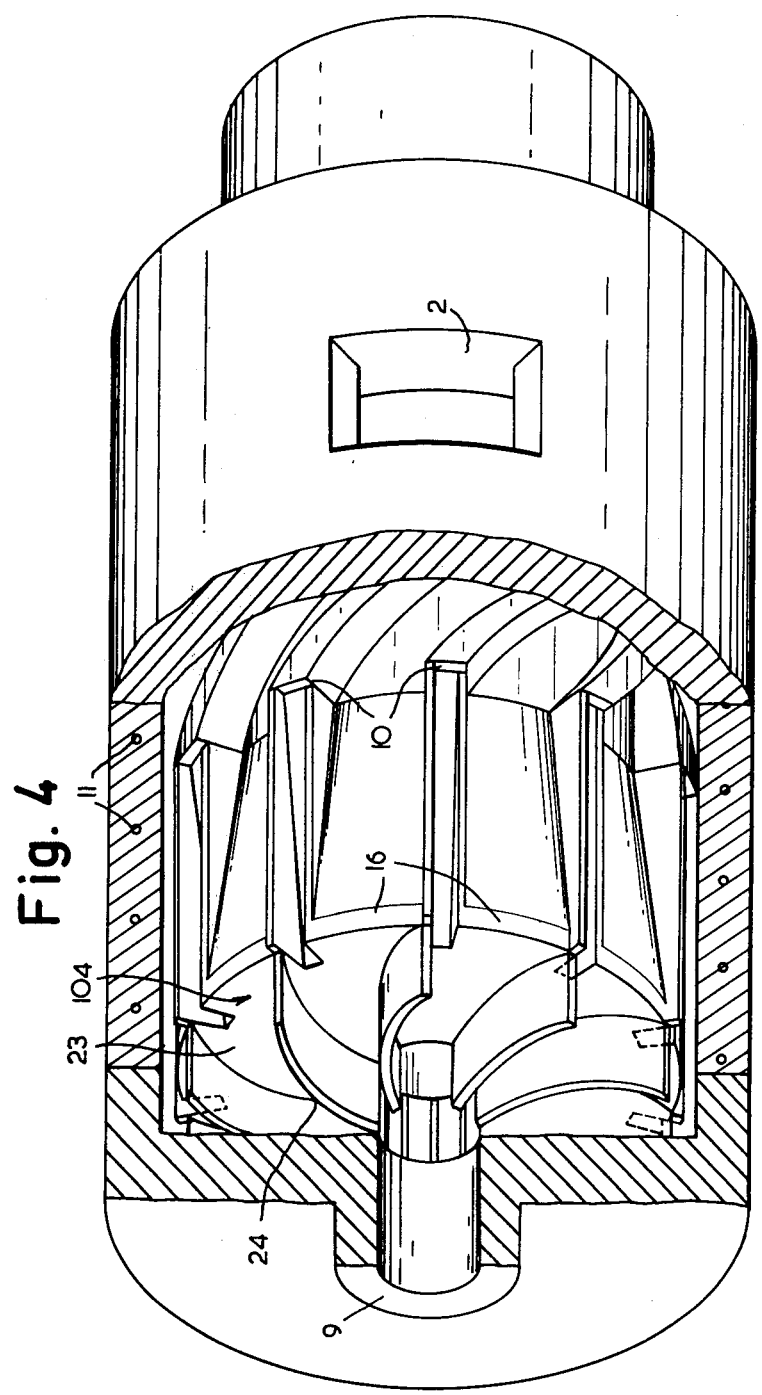

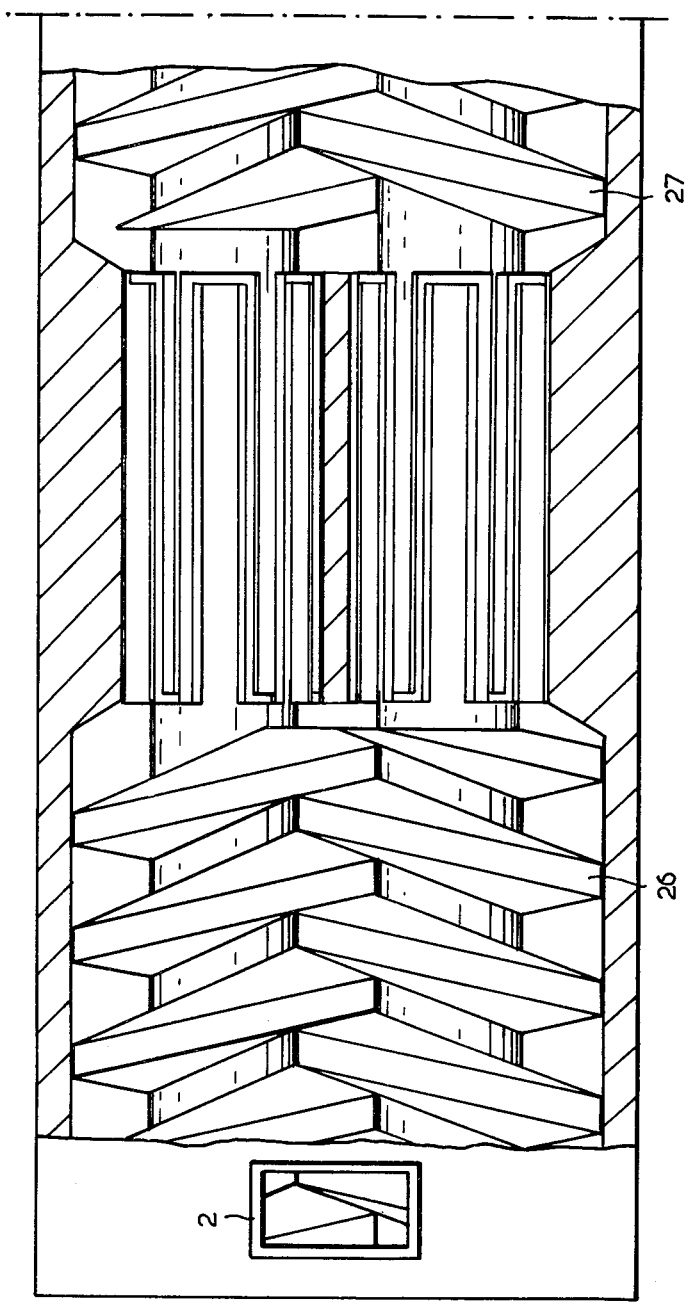

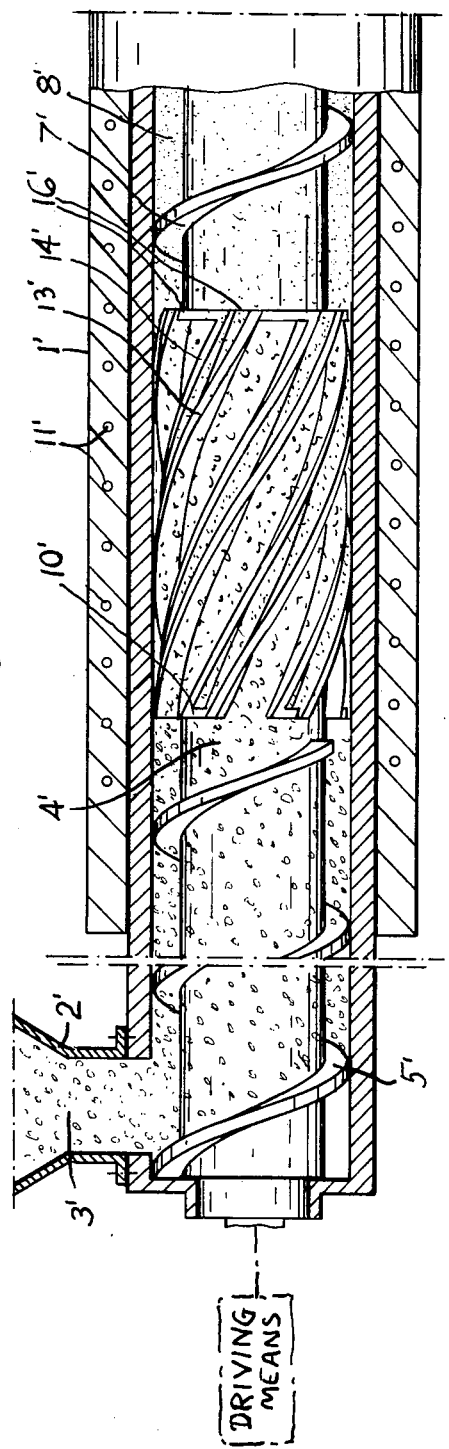

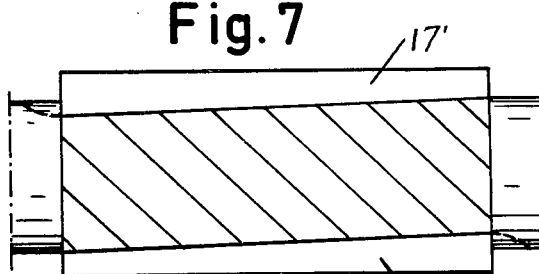
Fig. 7
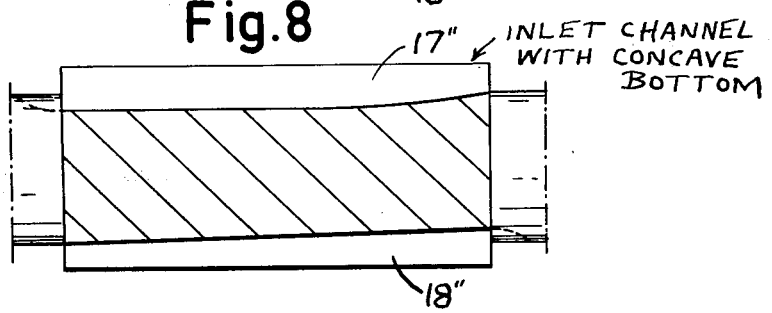
Fig. 8 INLET CHANNEL WITH CONCAVE BOTTOM
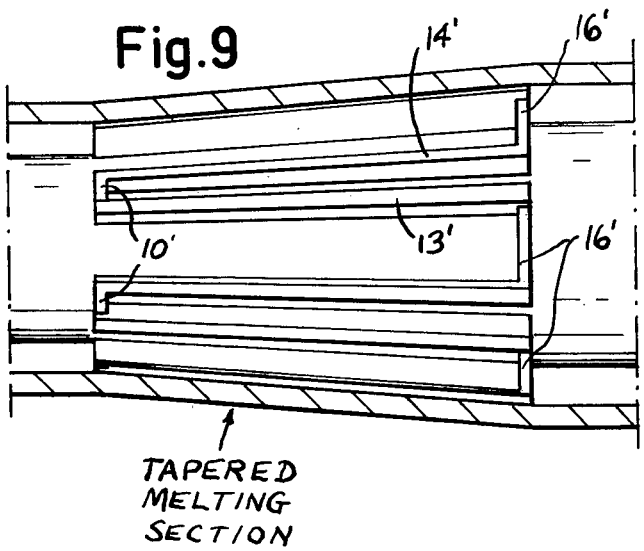
Fig. 9
TAPERED MELTING SECTION

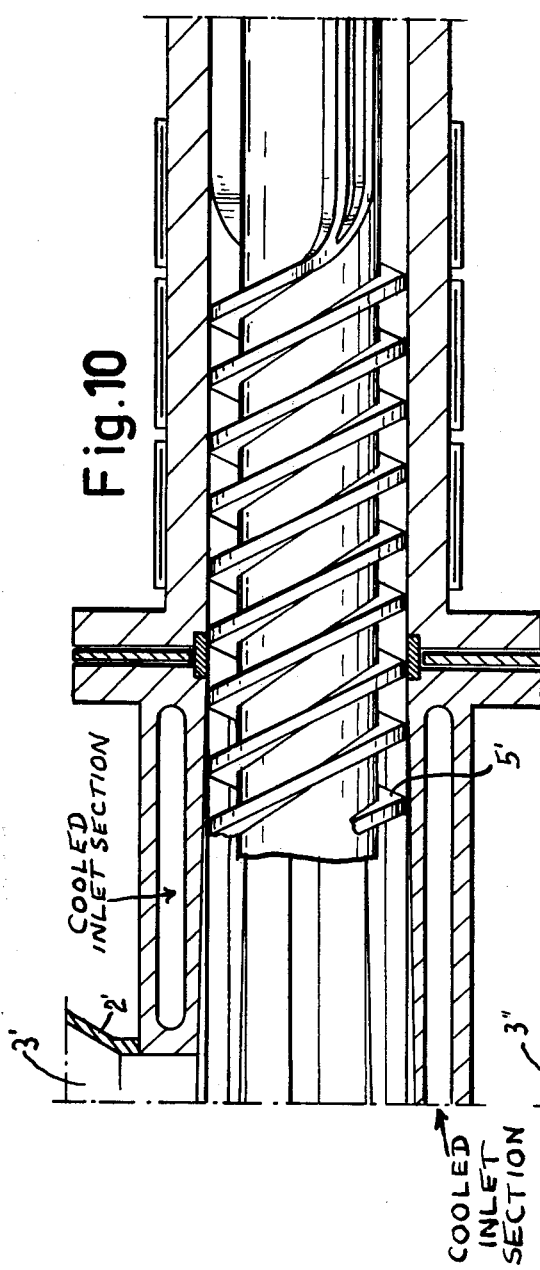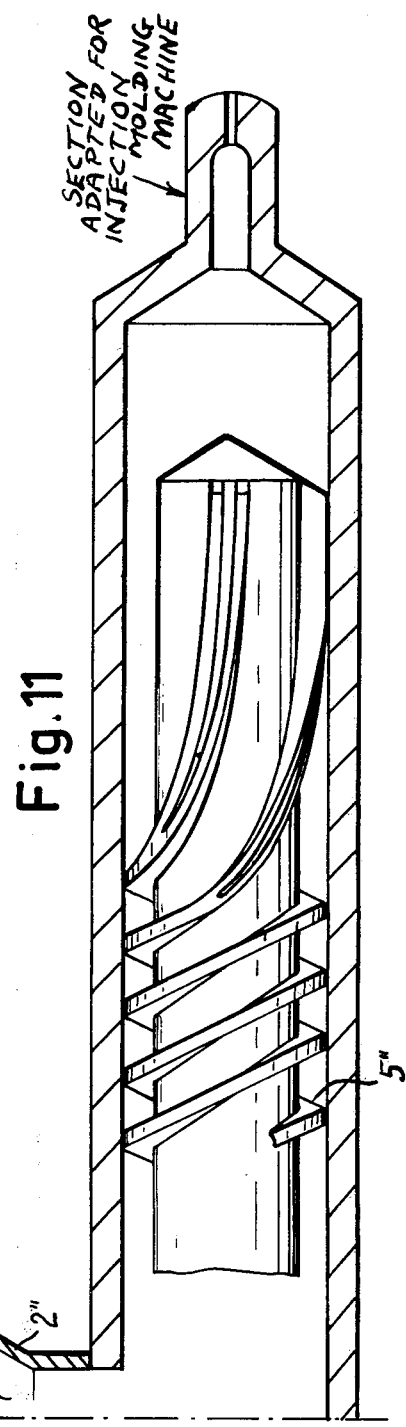

APPARATUS FOR MELTING A THERMOPLASTIC MATERIAL

The present invention concerns apparatus for melting a thermoplastic material in order to obtain an at least nearly homogeneously molten mass, according to which heat is supplied to an initially substantially unmolten granular or similar material while it is being transported by pumping means through the space between a housing of circular cross section and a body rotating in it.

According to heretofore known apparatus for of this kind, the rotating body usually consists of a screw spindle provided with a singlestart thread for transporting the material, while the housing is fitted with heating means.

The first small quantity of melt is formed at a part of the wall of the heated space where it forms a thin layer between said part of the wall and the still unmolten material.

By means of this thin layer the heat necessary for further melting of the thermoplastic material is supplied to the unmolten material, partly by conduction of heat from the heated wall of the housing to be unmolten material, partly because in said layer of melt, the relative motion between the walls of said space and the unmolten material sustains a flow in which the mechanical energy, taken up for sustaining said relative motion is converted into heat-energy, which likewise benefits the melting process.

A disadvantage of this kind of apparatus consists in that the width of the plug of unmolten material moving forward through the screw channel decreases in the direction of transport, because, as the melting process progresses, the molten material formed occupies an increasing part of the width of the screw channel. As a result thereof, the surface area per unit of length of the rotating body (c.q. of the channel) available for the supply of heat to the unmolten plug of thermoplastic material, decreases continually in the direction of transport whereby the melting process progresses at a continually decreasing rate.

According to current opinion, the thickness of the thin layer of melt between the heated wall of the housing and the plug of unmolten thermoplastic material increases in the direction of relative motion of this wall in respect to said plug. This represents a second disadvantage of the heretofore known methods of the kind described, notably that the supply of heat to the unmolten plug of material decreases with increasing thickness of said layer of melt. Attempts have been made to reduce the effect of this disadvantage by the use of a multiple start screw over at least a part of the length of the screw spindle, but such a measure leads, ceteris paribus, to a reduced conveying effect of the screw whereby either the output of the installation is reduced or the pressure generated in the entry zone remains below that of a single start screw.

Lastly, in the case of heretofore known apparatus, especially at relatively high rates of production, the phenomenon arises that the unmolten material, considered in the longitudinal direction of the screw-channel, does not constitute an uninterrupted plug but that locally, during the melting process, the entire cross section of the screw-channel contains melt only. In these places consequently no further melting takes place so that the screw-channel length required for the complete melting of the material is larger than would be necessary without such interruption. More serious yet is that this phenomenon, often called solid bed breakage, is the cause, at least according to many experts, of pressure fluctuations during the extrusion which in turn lead to irregularities in the output per time unit. Such output irregularities may lead, especially in processes like cable covering and film production, to a reduced quality of the product. It has already been tried to prevent solid bed breakage by the addition of special windings to the screw but these attempts did not bring improvements with regard to decreasing plug width nor to increasing thickness of the layer of melt, such that the output per time unit per unit length increased only very slightly.

It is, therefore, an object of the present invention to provide an improved apparatus for an increased melting rate per unit length of the rotating body.

These and other objects and advantages of the invention will appear more clearly from the following specification in connection with the accompanying drawings, in which:

FIG. 1 is a diagrammatic longitudinal section of a part of an extruder with single start screw pump in which a melting section is provided according to the invention.

FIG. 2 is a representation on a larger scale of the parts lying within the area II of FIG. 1.

FIG. 3 is a cross section taken along the line III—III in FIG. 2.

FIG. 4 is a diagrammatic perspective view of a rotatable body having a melting section according to the invention, with a disc pump fitted onto the downstream terminal plane of the rotatable body.

FIG. 5 is a diagrammatic section of a double screw pump extruder in which melting sections according to the invention are included.

FIG. 6 is a diagrammatic longitudinal section of a part of an extruder with primes provided for reference numerals identifying features similar to those of FIG. 1 and showing helical ridges differing from the ridges of FIG. 1.

FIG. 7 shows a cross-sectional view taken along line VII—VII in FIG. 3 to show an inlet channel with a diminishing sectional area and a discharge channel with an increasing sectional area in the conveying direction.

FIG. 8 shows another cross-sectional view taken similar to that of FIG. 7 to show an inlet channel with a concave bottom as well as a discharge channel as already indicated in FIG. 7.

FIG. 9 is similar to that of FIG. 2 and showing a tapered melting section.

FIG. 10 is a longitudinal section of apparatus of the present invention as provided with a cooled inlet section.

FIG. 11 is a longitudinal section of apparatus of the present invention adapted for an injection molding machine.

The apparatus according to the present invention is characterized primarily in that the supply of heat takes place at least substantially over an axial distance of the space between the housing of circular cross section and a body rotatable therein. Over the said distance, said space, considered along the circumference, is divided into alternating entry—and exit channels formed by first ridges, fixedly attached to said rotating body over said distance and running along the inner surface of said housing at least nearly blocking the passage of molten material, and by second ridges, respectively arranged between two first ridges and at least substantially parallel thereto and fixedly attached to said rotating body which second ridges run along the inner surface of the housing with a certain clearance at least substantially blocking the passage of unmolten material. The ends of the first and of the second ridges are alternatively connected by dams at the supply and at the discharge side in such a way that the melt formed in the entry channels is separated from the unmolten material in said entry channels by flowing over the second ridges into the exit channels.

According to the apparatus of this invention, the melt is continuously urged into the exit channels over said second ridges which carry out the function of overflow weirs while unmolten material only remains, at least substantially, in the entry channels. This unmolten material is, therefore, supplied with heat through the intermediary of only a thin film of molten material and over the full width of the entry channels. It turns out that a considerably larger melt production per unit time is obtained in this way which allows, for instance, a considerable reduction in the length of the rotating body.

Additionally an increased internal heat generation in the melt film is obtained because of the favorable velocity vector of the relative motion of the solid material in respect to the housing. This velocity vector functions optimally when an at least nearly axial direction is chosen for the ridges on the rotating body.

According to a further development of the invention, provision may be made, that for obtaining an at least nearly constant transport velocity of the solid plug and thereby an at least nearly constant vector of the velocity of the solid plug in respect to the housing, the sectional area of the entry channel filled with at least substantially unmolten material, is reduced to the same extent as the thermoplastic material is molten, and is passed to the exit channel. In this way, the heat supply to the solid plug remains at least substantially constant over the length of the entry channel.

The invention also relates to an apparatus for practicing the invention. This apparatus comprises supply means for the supply of unmolten thermoplastic material to pumping means which transport said material to and through a melting section formed by a housing with heating means and a rotatably drivable body within said housing, and means to remove the formed melt from the apparatus and driving means for driving said body in which the rotatable body is provided with inlet channels open to the supply side which, in circumferential direction, alternate with exit channels open to the discharge side. The inlet and exit channels are formed by first ridges extending over said melting section, fixedly attached to said rotatable body which may run along the inner surface of the housing at least nearly preventing the passage of molten material, and by second ridges, respectively arranged between two first ridges and at least substantially parallel to these, fixedly attached to said rotatable body and dimensioned to run along the inner surface of said housing with a certain gap, at least substantially preventing the passage of unmolten material. The inlet and exit channels also comprise dams connecting the ends of the first and the second ridges alternately at the supply and at the discharge side while the first ridges have preferably at least mainly an axial direction.

Further also said first and said second ridges may have an extremely narrow top edge, their width being determined only by structural requirements. By furthermore dimensioning said dams at the supply side as well as at the discharge side to leave a gap between said dams and the inner surface of the housing equal to the gap between the second ridges and said inner surface, the available length for overflow of the melt is increased.

In an apparatus according to the invention the inlet channels may effectively possess a greater width than the exit channels, whereby the unmolten mass, over the flow length of the rotatable body, acquires a large effective surface area for transfer of the heat supplied.

The above mentioned second disadvantage of heretofore known and existing apparatus is decreased according to the invention by the use of a number of inlet and exit channels, preferably at least three sets, whereby the increase of the thickness of the melt film in the direction of said relative motion is reduced. For a large diameter of the rotatable body it is preferable to use more than three sets of channels in order to reduce said increase of thickness of said melt films.

The number of channels to be used is limited, however, by the fact that each additional set of channels requires an extra first and second ridge whereby the part of the circumference of the rotatable body, available for the channels themselves decreases by the width of a first and of a second ridge. This consideration, in actual practice always leads to a compromise in the choice of the number of channels. The smaller the width chosen for the entry channel, the higher will be the average melt production per unit area. The optimum number of channels depends on the material properties and may lead to different results for different thermoplastic materials and operating conditions. The optimum is always given by the number of channels for which the product of average melt production per unit area and of the total fraction of the circumferential length of the rotatable body available for entry channels reaches a maximum.

In order to obtain an apparatus of the operation in which said velocity vector of the solid plug is at least nearly constant over the full length of the rotating body, an apparatus according to the invention may be provided with a diminishing depth of the inlet channels, in such a way that viewed in the direction of flow, the cross sectional area of the inlet channels decreases at constant width of said channels. To this end the inlet channels may be given a distinct depth profile in such a way that the velocity of the solid plug in the flow direction remains constant. In this way the heat supply to the solid plug remains constant per unit length of said plug. It has been found that the average temperature of the solid material increases in the flow direction, to the extent that, toward the end of the entry channel, this average temperature approaches the melting temperature of the material. As a result of this temperature rise and at constant heat supply, a larger part of the heat supplied will, viewed in the direction of flow, become available to melt the material in such a way that the melting rate viewed in the direction of flow, increases gradually. In order to discharge the quantity of molten material increasing in the flow direction and per unit length, so as to maintain a thin melt film discussed above, it has been found effective not to give the depth of the inlet channel a linear profile, but to make the bottom of the channel concave in the transport direction.

As the mean transport velocity of the molten material in the exit channel towards the discharge side of the rotating body should preferably be kept at least approximately constant, in order to prevent the occurrence of intolerably high dwell times of the melt near the beginning of the exit channel, the cross-sectional area of the exit channels preferably increases in the flow direction.

In order to prevent undesirably high pressure gradients from occurring in the starting region of the exit channels, the depth of the exit channels at constant width thereof may at least roughly follow the equation:

$$h = h_o + C \cdot z^{\frac{1}{m+2}}$$

in which h designates the channel depth, $h_o$ the depth at the start of the channel, and z the distance from the dam at the supply side. C is a constant determined by the channel width, the melt viscosity, the quantity of material to be transported per channel and the chosen pressure gradient, while m designates the so-called viscosity index in the Ostwald-de Waele equation.

In the melting section of the apparatus according to the invention, little or no transporting action is exerted onto the molten and onto the unmolten material. The pressure required to pump the material through the apparatus is rather high as a consequence and may reach some hundreds of atmospheres. It is therefore necessary to use the melting section in combination with pumping means formed by an effective, high pressure generating, solid materials transport zone. Such effective transport zones are known. A satisfactory embodiment comprises a single start transport screw in a housing provided on the inside surface thereof with axial grooves over the length of the solids transport zone. For a good functioning of such a supply part it is desirable to keep the housing effectively cooled over at least the grooved length thereof.

In order to prevent that such cooling will, to an inadmissible degree, withdraw the heat supplied by heating means to the housing of the melting section, a heat barrier must be fitted between the housing of the inlet section and the housing of the melting section.

It has been found that the distance between said heat barrier and the dams at the supply side of the melting section must be equal to at least the diameter of the rotatable body and should preferably be less than three times this diameter. Over at least a part of said distance, the rotatable body may be provided with a screw channel having at least approximately the same shape and dimensions as the screw channel in the inlet section, while said screw channels link up with each other.

It may be stated generally that the invention lends itself to the use of pumping means consisting of screw channels, connecting with the channels of the melting section, placed on a part of the rotatable body of the melting section which lies outside said melting section. This does not exclude that the housing may have a diameter which changes in the axial direction.

With regard to what has been stated above concerning the high pressure required on the thermoplastic material to be transported through the melting section, the invention may advantageously be applied to a screw pump in which the housing contains two rotatable bodies the screw channels of which constitute the pumping means and interlock in such a way that a twin-screw pump known per se is formed. Each of said rotatable bodies is provided with a section onto which said first and second ridges and the dams connecting them are affixed. Each of said sections is rotatable within a part of the housing having a circular cross-section. In the combination with a twin-screw supply pump, a twin screw discharge pump may be used advantageously beyond the melting section.

Apparatus according to the invention may advantageously be designed with a rotatable body having a large diameter and a short length, a disc pump for the further transportation of the melt discharged from the exit channels may effectively be fixedly attached to the consequently large terminal plane of the rotatable body.

Plasticizing apparatus for an injection molding machine, operating on the principle of injection by an axially movable screw functioning during the injection as a plunger, may also effectively be provided with an extruder part comprising a melting section accroding to the invention.

Referring now to the drawings in detail, FIGS. 1, 2 and 3 illustrate an extruder which consists primarily of a housing 1 with a feed hopper 2 for the granular thermoplastic 3, a body 4 rotatably mounted in said housing 1, and driving means for rotating said rotatable body 4. The left hand portion (with regard to FIG. 1) of the rotatable body 4 is formed by a screw pump or conveyor 5 in communication with the melting section 6, while the rotatable body 4 further continues in the form of a screw pump or conveyor 7 which transports the melt 8 under pressure to molding means not shown. The melting section 6 possesses heating means 11 around the housing 1. The rotatable body 4 is provided with alternating first ridges 13 and second ridges 14, interconnected by dams 10, 16 in such a way that wide inlet channels 17 and narrow discharge channels 18 are formed. The first ridges 13 leave such a gap with the inner surface of the housing that molten thermoplastic material cannot, or can only at a low rate, pass between a first ridge 13 and the inner surface of the housing 1. The second ridges 14 leave a gap with the inner surface of the housing 1, which gap is wider than that between the inner surface and the first ridges 13, so that the passage of molten material is possible but that practically a barrier is formed against the passage of unmolten material. The dams 10, 16 leave a gap with the inner surface of the housing 1 which is not larger than the gap of the second ridge 14. The entry channels 17 of the melting section 6 are open to the screw pump 5; the discharge channels 18 are open to the screw pump 7.

The operation of the apparatus is as follows: From the feed hopper 2, the granular thermoplastic material 3 drops into the screw pump or screw conveyor 5 which transports this material (see drawing) towards the right hand side. Over this transport section the housing 1 is not heated from the outside until in the proximity of the melting section 6, on the one hand in order to generate a high pressure in the solids material, on the other hand because it is desirable that the plug of the thermoplastic material 3 is fed into the melting section 6 surrounded by only a thin layer of melt. The granular material 3 is urged into the entrance channel 17 and there experiences the heat from the heating means 11 as well as the heat generated in the thin layer of melt 19 contiguous with the housing 1 by the relative motion between the thermoplastic material 3 and the housing 1. The thickness of the layer of melt 19 thereby increases in the direction of relative motion. The layer of melt 19 passes over the second ridge 14 to the extent that at the entrance of the material in the melting section sufficient melt has already been formed also over the dam 10. The plug of solid material 3 is pushed in the direction of the arrow 21 in FIG. 2, while further melting of this plug takes place, and the formed melt 8 flows over the second ridge 14 into the discharge channel 18 and, at the end of the inlet channel 17, over dam 16 directly to the screw pump 7 as well, whereupon melt 8 is taken up by the screw pump and transported further.

FIG. 2 shows the velocity vector 22 of the relative motion of the inner wall of housing 1 with reference to the plug of solid thermoplastic material 3.

In FIG. 4 a particularly efficient embodiment of the invention is shown in which a large diameter of the rotating body 14 has been chosen. The consequently large front-end 23 is fitted with a disc pump 24. The functioning conforms to the method described above, but this embodiment shows that an apparatus according to the invention can be built extremely short.

FIG. 5 shows a diagrammatic cross section of an apparatus (viewed from above) in which two melting sections according to the invention have been included while the pumping means consist of so-called double screw pumps 26, 27, known per se.

FIG. 6 shows helical ridges 13', 14' following a screw path having a pitch angle within the range of 45° to 90° inclusive.

FIGS. 7 and 8 show added cross-sectional views including an inlet channel with a diminishing sectional area and a discharge channel with an increasing sectional area in the conveying direction. FIG. 8 shows an inlet channel with a concave bottom and discharge channel as in FIG. 7.

FIG. 9 is similar to FIG. 2 and shows a tapered melting section.

FIG. 10 shows a longitudinal section provided with a cooled inlet section.

FIG. 11 shows a longitudinal section adapted for an injection molding machine.

It is, of course, to be understood that the present invention is, by no means, limited to the specific showing in the drawings, but also comprises any modifications within the scope of the appended claims.

What I claim is:

1. An apparatus for melting a thermoplastic material, which includes: a housing having an inner surface of a substantially circular cross section and also having inlet means for receiving a thermoplastic material, rotatable means having an inlet side adjacent to and communicating with said inlet means and also having an outlet side, said rotatable means being rotatable in said housing and defining therewith a heating space, means for conveying a substantially solid, particulate or granulate thermoplastic material into said heating space, said heating space being located between said inlet and said outlet side, said housing comprising heating means surrounding said heating space for melting thermoplastic material received therein, said rotatable means comprising at least three pairs of alternating first and second ridges, having a width at the top which is relatively small, said ridges being fixedly connected to said rotatable body and located within the region of said heating space, said ridges following a screw path having a pitch angle within the range of from 45° to 90° inclusive, while each two adjacent first and second ridges form with each other relatively wide inlet channels and relatively narrow discharge channels, said inlet channels having a width larger than twice the width of said discharge channels, said first ridges extending along the inside surface of said housing and close thereto, said second ridges respectively being arranged between said first ridges and extending substantially parallel to said first ridges, said second ridges extending along said inner surface of said housing with such a clearance relative to said inner surface as to substantially prevent the passage of non-molten material through the space defined by said clearance, and transverse wall means interconnecting the ends of adjacent first and second ridges respectively so that said inlet channels are open to said inlet side for the material to be melted while the discharge channels are open to said discharge side.

2. An apparatus according to claim 1, in which said first ridges are at least nearly axially disposed.

3. An apparatus according to claim 1, in which said transverse wall means consist of dams which extend substantially tangentially on said rotatable body and have a clearance with the inner surface of the housing which allows the passage of molten material but prevents the passage of unmolten material.

4. An apparatus according to claim 1, in which said inlet channels have a cross sectional area which diminishes in the conveying direction of said rotatable means.

5. An apparatus according to claim 4, in which the bottoms of said inlet channels are concave in said conveying direction.

6. An apparatus according to claim 1, in which said discharge channels have a cross sectional area increasing in the conveying direction of said rotatable means.

7. An apparatus according to claim 6, in which said discharge channels have an at least constant width and of the discharge channels, a depth h satisfying at least approximately the equation:

$$h = h_o + C \cdot z^{\frac{1}{m+2}}$$

in which "$h_o$" is the initial depth, "z" the distance from the dams at the supply side, "m" the viscosity index according to Ostwald—de Waele, and "C" is a constant factor determined by the channel width, the viscosity of the melt, the quantity of material to be transported per unit time per channel and by the chosen pressure gradient.

8. An apparatus according to claim 1, in which said housing has an internal diameter changing in its axial direction.

9. An apparatus according to claim 1, in which said housing has a cooled inlet section which is separated from said heating space by a heat barrier, the distance from said heat barrier to said transverse wall means at the inlet side of the heating space being equal to at least one and to at most three times the internal diameter of said housing.

10. An apparatus according to claim 1 in which said rotatable means is reciprocably movable in an axial direction with respect to said housing so as to form a plunger pump for intermittently ejecting molten material.

* * * * *